United States Patent [19]

Frisch

[11] Patent Number: 4,674,715
[45] Date of Patent: Jun. 23, 1987

[54] MEASURING ARRANGEMENT FOR DETERMINING THE ATTITUDE OF AN EARTH SATELLITE

[75] Inventor: Eberhard Frisch, Unterhaching, Fed. Rep. of Germany

[73] Assignee: Messerschmitt-Boelkow-Blohm Gesellschaft mit beschraenkter Haftung, Munich, Fed. Rep. of Germany

[21] Appl. No.: 761,957

[22] Filed: Aug. 2, 1985

[30] Foreign Application Priority Data

Aug. 3, 1984 [DE] Fed. Rep. of Germany ....... 3428741

[51] Int. Cl.4 .............................................. B64G 1/36
[52] U.S. Cl. .................... 244/171; 250/203 R
[58] Field of Search ............ 244/171, 158 R, 172, 244/173; 250/203 R

[56] References Cited

U.S. PATENT DOCUMENTS 3,188,472  6/1965  Whipple, Jr. ...................... 244/171
4,358,076  11/1982  Lange et al. ....................... 244/171
4,374,579  2/1983  Renner et al.

OTHER PUBLICATIONS

Mobley et al., "The SAS-3 Attitude Control Sys" APL Tech. Digest vol. 14, No. 3, Jul.-Sep. 1975, pp. 16-24.
"Space World-The Magazine for Space News", pp. 3-8, vol. L-9-141; of Sep. 1975, published by Palmer Publications, Inc.
Esa Bulletin 38, May 1984, pp. 12 to 16.
"Star Tracker", edited by Messerschmitt-Bölkow--Blohm GmbH, Space Systems Group, Dec. 1984.

Primary Examiner—Galen Barefoot
Attorney, Agent, or Firm—W. G. Fasse; D. H. Kane, Jr.

[57] ABSTRACT

The attitude of a satellite in an earth orbit is determined by a measuring arrangement which includes the body (1) of the satellite oriented with regard to the sun and a functional component (2) rotationally connected to the satellite body (1). The functional component 2, such as a turntable, carries functional elements, for example, antennas, which are directed or oriented toward the earth. During an earth orbit of the satellite, the turntable (2) carries out one full revolution in the direction of the earth orbit about a rotation axis (3) perpendicular to the orbit plane. A first star sensor (4) is arranged to sight in a direction along the rotation axis (3). In order to achieve a high attitude accuracy in the orientation of the turntable (2), the first star sensor (4) is mounted on the turntable(2) and at least one second star sensor (5) is also mounted on the turntable but with a sight direction (6) deviating from the direction of the rotation axis (3).

2 Claims, 2 Drawing Figures

MEASURING ARRANGEMENT FOR DETERMINING THE ATTITUDE OF AN EARTH SATELLITE

FIELD OF THE INVENTION

The invention relates to a measuring arrangement for determining the attitude of an earth satellite which comprises a satellite body and a functional component or part or platform rotatably connected to the satellite body. The functional component carries functional elements, such as antennas or camera systems, which are directed toward the earth. The functional component carries out one full revolution in the orbit direction with respect to the satellite body for each earth orbit, about a rotational axis extending perpendicularly to the orbit plane. A star sensor is oriented in the direction of the rotational axis.

DESCRIPTION OF THE PRIOR ART

Such earth satellites for use in orbit planes coincident with or only slightly inclined with respect to the earth's equatorial plane and carrying measuring equipment for attitude determination are known from U.S. Pat. No. 4,374,579, as well as from ESA Bulletin 38, May 1984, pages 12 to 16, FIG. 4 esp. For communication or earth surface surveying or mapping purposes the satellite carries antennas or camera systems fixed to the functional platform which is rotatably mounted on the satellite body for rotation about a rotational axis oriented perpendicularly to the orbit plane. In orbit the functional platform rotates about this axis in such a way that the functional elements (antennas or cameras) are always directed very exactly to the earth. For energy supply purposes the satellite body carries solar panels which are always to be oriented toward the sun in the maximum possible degree to steadily receive the maximum possible solar radiation energy. Therefore the satellite body rotates about the rotational axis once in a year, thereby always turning the same outer surface and the solar panels to the sun in the maximum possible degree taking into account the 23° inclination of the equatorial plane with respect to the ecliptic plane. If the solar panels are fixedly mounted to the satellite body the angle of incidence of the solar radiation varies between ±23° during the earth's orbital path around the sun, provided that the satellite's orbit around the earth is an equatorial or geostationary one. Furthermore, to comply with the first requirement, the functional part or platform rotates about the rotational axis approximately once every twenty-four hours. A star sensor mounted onto the satellite body is provided to maintain the rotational axis in its required orientation in space, namely perpendicular to the satellite's orbit plane. The sight direction of this star sensor coincides with the direction of the rotational axis and is oriented toward the north or south in the case of an equatorial satellite orbit. The satellite body carries a sun sensor on the outer surface which is always oriented to the sun, whereby the desired orientation of the satellite body with respect to the sun can be maintained. Furthermore, fuel containers and the necessary propulsion plants are also carried by the satellite body, among other equipment.

The prior art measuring device for attitude determination however, has various disadvantages. Above all, it should be noted that the attitude of the satellite body itself to which the sun and star sensors are attached, are directly determined and controlled, although the attitude accuracy of the satellite body is much less important than the attitude accuracy of the functional part in a practical application. The attitude accuracy of the functional part is more important, because the functional elements carried by the functional part must be directed with great accuracy toward the earth. All errors or inaccuracies arising between the satellite body and the functional part rotatably connected to the satellite body, enter fully as inaccuracies of the orientation of the functional part. In order to achieve a position accuracy of the functional part of 0.15°, a position accuracy in the control of the satellite body of approximately 0.05° is required, so that 0.10° is allowed for such inaccuracies which may arise in the coupling and tracking between the satellite body and the functional part. Even then it is not assured that the actual errors arising during the entire mission are constantly less than 0.10°. The required accuracy depends to a substantial extent on the rotational coupling which causes the exactly measured rotation of the functional part with respect to the satellite body. Hence, the precision of the coupling is most important. An extremely precise coupling for achieving the desired accuracy of the orientation of the functional part is rather expensive.

Furthermore, an essential component of the known measuring device is the sun sensor. However, the sun sensor is not useable when the satellite passes through the earth's shadow. Therefore, the satellite must be equipped with a flywheel or gyroscope having a rotational axis constantly pointing toward the sun. For achieving a successful mission it is necessary that during the shadow phases any interference or disturbing moments acting upon the satellite remain so small that the arising attitude errors do not exceed the acceptable level. Moreover, the sun sensor provides indications subject to an error of up to 0.35° due to earth albedo. This error may be reduced to 0.025° by the use of a second sun sensor with a narrower field of view. This error magnitude is approximately the acceptable error limit. However, analog sun sensors are subject to a drift error and other inaccuracies which are at least as large in magnitude as the above mentioned errors, and which increase during the course of a mission. Digital sun sensors which avoid these additional inaccuracies are generally too expensive.

A further disadvantage of the prior art arrangements is seen in that star sensors oriented in the direction of the rotational axis are located near the apogee thrusters and sight in the same direction as the thrust stream or jet. It may therefore be expected that the optical components of the star sensor become dirtied by the apogee thruster.

OBJECTS OF THE INVENTION

In view of the foregoing it is the aim of the invention to achieve the following objects singly or in combination:

to improve the accuracy of a measuring arrangement for the attitude determination of an earth satellite, whereby the attitude of the functional part of the satellite is determined directly, and not subsequent to or dependent upon the attitude accuracy of the satellite body itself;

to eliminate or at least substantially avoid the influence of coupling movement errors between the satellite body and a functional part or component of an earth satellite to thereby eliminate the need for a high precision rotational coupling between the satellite body and the functional part or component;

to avoid inaccuracies and errors associated with sun sensors in such a measuring arrangement so that it may successfully operate in the earth's shadow, avoids earth albedo errors, and avoids the additive increasing drift errors of analog sun sensors and the cost of digital sun sensors;

to avoid the location of star sensors near the apogee thrusters of such an earth satellite and thereby avoid dirtying of the optics; and to provide a more precise earth satellite attitude determination at less expense and in shorter time periods than has been possible in the above mentioned prior art.

SUMMARY OF THE INVENTION

These objects have been achieved in a measuring arrangement for determining the attitude of an earth satellite according to the invention, in that a first star sensor oriented in the direction of the rotation axis is arranged on a functional component or platform, and in that at least one additional or second star sensor is arranged on the functional platform. This additional star sensor has a sight direction which deviates from the sight direction of the first star sensor and thus from the direction of the rotation axis.

According to the invention the attitude of the functional platform is directly measured and determined, whereby the all-important accuracy of the attitude of the functional elements attached to the platform is improved. Any attitude deviations of the functional platform may now be detected and measured with a greater accuracy than heretofore. Attitude control may be initiated even if the functional part or platform deviates by a very small amount or inaccuracy from the desired or rated attitude, independently of whether such attitude inaccuracies or deviations have already happened for the satellite body. The attitude control of the functional elements can thus be accomplished with greater precision and at a smaller delay time than heretofore.

A further detail of the invention limits the angle between the rotational axis and the sight direction of the second star sensor to approximately 67° at most, preferably to a range between 53° and 63°, for orbital paths in the the equatorial plane. This angle limitation assures that damage to the star sensor due to a direct sight contact with the intensely bright sun is prevented. The sight direction of the angularly arranged additional star sensor or sensors sweeps practically through a cone shaped configuration during an earth orbit.

In a geostationary satellite, the star sensors angled with respect to the rotation axis complete one rotation with respect to the satellite body in about twenty-four hours. The information gathered by the angled star sensor or sensors and by the star sensor sighting in the direction of the rotation axis, provides a complete attitude reference, so that a sun sensor is basically no longer required. The rotation, or rather, the revolution of the star sensor or sensors angled with respect to the rotation axis, is advantageous since it scans a ring-shaped space segment or space angle within twenty-four hours, and each star sensor may then be used exactly at the time when an especially bright star passes through its field of view.

The attitude accuracy is determined according to the invention only by the star sensors and such accuracy is typically in the order of 0.03°. Since the star sensor means are mounted on the functional part, a corresponding attitude accuracy of this functional platform and of the functional elements carried by the platform is realizable. Therefore, errors which may, perhaps, arise between the functional platform and the satellite body become almost completely irrelevant. These features and advantages facilitate not only the orientation of the functional elements, for example antenna- or camera-systems, they also make the orientation considerably more accurate with an error below 0.05° instead of 0.15°. Additionally, the satellite becomes considerably cheaper, especially with regard to development costs.

BRIEF DESCRIPTION OF THE DRAWINGS

In order that the invention may be clearly understood, it will now be described, by way of example, with reference to the accompanying drawings, wherein.

DETAILED DESCRIPTION OF A PREFERRED EXAMPLE EMBODIMENT AND OF THE BEST MODE OF THE INVENTION

Figure 1:
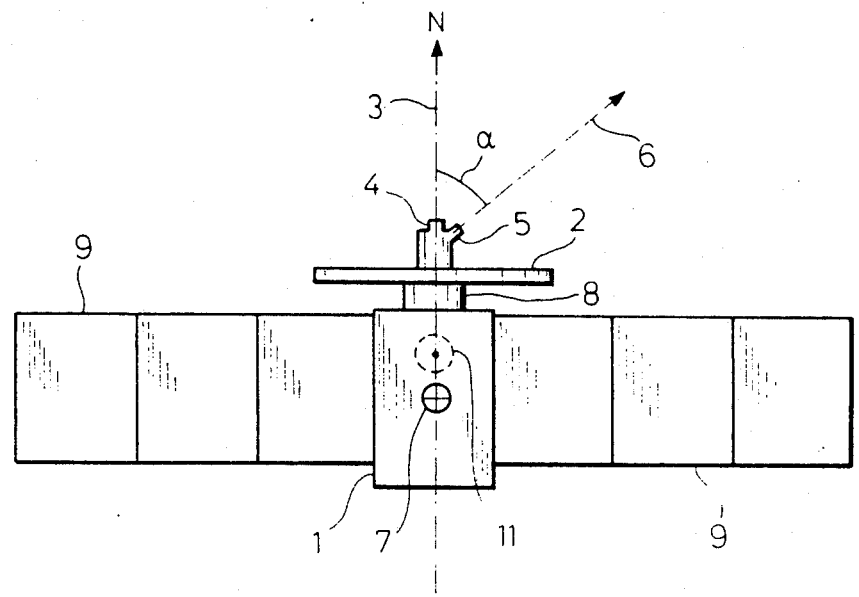
FIG. 1 is a schematic view of a satellite with an attitude determination system according to the invention.

FIG. 1 shows a satellie essentially comprising a satellite body 1 and a functional part such as rotatable platform 2. The platform 2 is connected to the satellite body 1 by a rotational coupling 8 of conventional construction and may rotate with respect to the satellite body 1 about a rotation axis 3, which is preferably directed northward. A sun sensor 7 is arranged on the outer side of the satellite body 1 which is always directed toward the sun to the maximum possible extent in order to register deviations of the satellite body 1 from a desired orientation with respect to the sun. The satellite body 1 furthermore carries foldable solar cell panels 9 which are similarly oriented toward the sun if the satellite body 1 is correctly oriented. During certain segments, such as spring or autumn, of the orbital path of the earth, the sun sensor 7 of an earth satellite passes through the earth's shadow once during each earth orbit, and becomes ineffective. In conventional satellites of the above discussed type, in which a sun sensor is necessary to maintain the orientation of the satellite body with respect to the sun, an inertial flywheel 11 was required as shown by a dotted circle in FIG. 1. The rotational axis of the flywheel 11 is also oriented toward the sun, in order to counteract, as much as possible, deviations in the orientation of the satellite body with regard to the sun while the satellite passes through the earth's shadow. The functional part or platform 2, which is connected to the satellite body 1 by the rotational coupling 8, carries functional elements which are not shown. These functional elements which may, for example, be antennas or cameras, must remain constantly oriented very exactly with respect to the earth. Furthermore according to the invention, a first star sensor 4 sighting in the direction of the rotation axis 3, or more specifically in the north direction, and one or more second star sensors 5 sighting in a direction 6 are provided. The direction 6 deviates from the rotation axis 3 by an angle α. All the star sensors 4, 5 are mounted on the platform 2, which rotates around the rotation axis 3 with respect to the satellite body. During an earth orbit, the platform 2 completes one full rotation about the rotation axis 3, whereby the star sensor 4 constantly maintains its sight direction which coincides with the rotation axis 3, and whereby it becomes possible to stabilize the orientation of this rotation axis 3 by means of appropriate attitude control means of conventional construction. However, the sight direction 6 of the star sensor 5 sweeps or scans through a complete cone-shaped configuration during a complete earth orbit. The sight direction 6 of the star sensor 5 must deviate by an appropriate angle α with respect to the rotation axis 3 so that the sight direction 6 does not pass directly across the sun, which would be damaging to the star sensor 5 due to the sun's strong radiation intensity.

Figure 2:
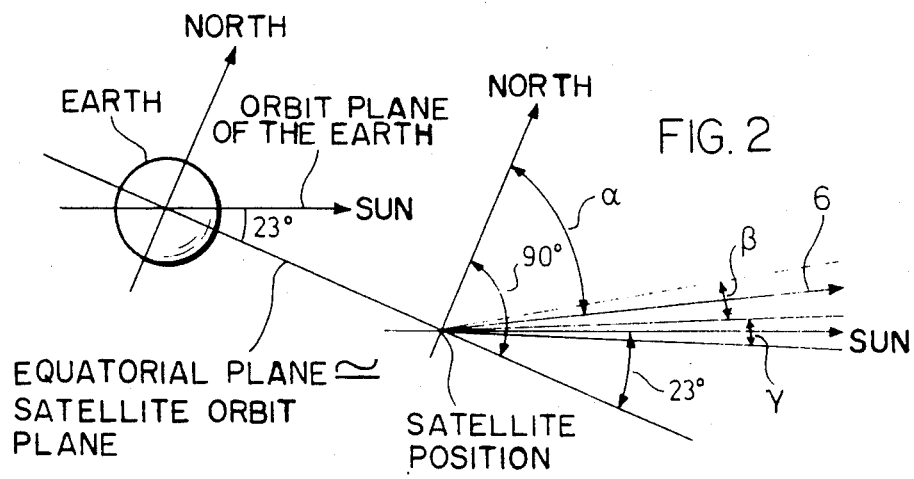
FIG. 2 shows the boresight angle and the relative orientation with respect to the earth of an attitude determination system according to the invention.

As shown in FIG. 2, for determining this appropriate angle α it must first be taken into account, that satellite orbit paths in the equatorial plane are angled by 23° with respect to the earth's orbit path around the sun. Further, it must also be considered, that the star sensor 5 has a certain sight or opening angle β, which usually lies in the magnitude range of several degrees and that the sun, as seen from the satellite, appears within a certain visual or opening angle γ. Thus, the following formula or equation for the maximum allowable magnitude of the angle 60 is derived:

$$\alpha = 90° - 23° - \tfrac{1}{2}(\beta + \gamma).$$

The star sensors 4 and 5 may be constructed by using photosensors or CCD arrays arranged on a surface. In the star sensor 4 a proper orientation is indicated, when the reference star, for example the north star Polaris, is constantly imaged on or by the same, certain sensor element. Any deviation away from the desired orientation may be determined by a constant electronic scanning of the sensor elements. Such scanning is conventional. In contrast, a large number of stars pass through the field of view of the star sensor 5 during a complete earth orbit. Several especially bright stars may be selected as reference stars among such a large number of stars. The exact moment at which these reference stars should pass through the field of view of the sensor 5 can be calculated with reference to the desired orientation. It may therefore be determined at what time and by which sensor element tthe reference star is to be sighted. In this mannerr any orientation deviations may also be determined with great accuracy. Such determination of orientation deviations is performed, depending on the number of selected reference stars, at shorter or longer time intervals. When the star sensor or sensors 5 have a limited sensitivity of the sensor elements, the number of selectable reference stars per star sensor 5 is also limited. The time spacing or interval between adjacent reference measurements or determinations may be reduced by the use of further star sensors which are similarly angled away from the rotation axis 3 and which have various sight directions. All of these additional star sensors are mounted on the platform 2.

A complete attitude determination is basically possible with the two star sensors 4 and 5. These star sensors may be redundantly arranged or provided. However, it is also possible to use only one star sensor 5, and in the event of its failure, to activate a sun sensor 7 arranged on the satellite body. Such a sun sensor 7 has a considerably smaller measuring accuracy, but is also considerably cheaper.

A star sensor which might be used in connection with the invention is described in the paper "Star Tracker" edited by Messerschmitt-Boelkow-Blohm GmbH, Space Systems Group, in December 1984.

Although the invention has been described with reference to specific example embodiments, it is to be understood, that it is intended to cover all modifications and equivalents within the scope of the appended claims.

What I claim is:

1. An earth satellite system, comprising an earth satellite body, an attitude control device, a functional component including functional elements to be oriented in orbit toward the earth, said functional elements being carried by said functional component, and means rotatably mounting said functional component to said satellite body for relative rotation thereto about a rotational axis (3) extending in a first direction perpendicularly to an orbit plane of said earth satellite body, said attitude control device comprising a first star sensor (4) mounted on said functional component and oriented for sighting in the direction of said rotation axis (3), and at least one second star sensor (5) also mounted on said functional component and oriented for sighting in a second direction deviating from said first direction of said rotation axis (3), at least said second star sensor (5) having only a very limited field of view centered about its sighting direction, said very limited field of view being imaged onto a photosensitive array of said second star sensor (5) for keeping said functional component exactly oriented toward the earth.

2. The measuring system of claim 1, wherein said very limited field of view of said second star sensor (5) is defined by an angle (β) which is in the range of several degrees.

* * * * *